(12) United States Patent
Kwak et al.

(10) Patent No.: US 12,026,063 B2
(45) Date of Patent: Jul. 2, 2024

(54) METHOD FOR CONFIGURATION OF SEMI-MANAGED DHT BASED ON NDN AND SYSTEM THEREFOR

(71) Applicant: Electronics and Telecommunications Research Institute, Daejeon (KR)

(72) Inventors: Ji Young Kwak, Daejeon (KR); Nam Seok Ko, Daejeon (KR); Sung Hyuk Byun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 262 days.

(21) Appl. No.: 17/522,406

(22) Filed: Nov. 9, 2021

(65) Prior Publication Data

US 2022/0171682 A1    Jun. 2, 2022

(30) Foreign Application Priority Data

Nov. 30, 2020   (KR) .......... 10-2020-0163863

(51) Int. Cl.
| | | |
|---|---|---|
| *G06F 11/14* | (2006.01) | |
| *G06F 11/30* | (2006.01) | |
| *H04L 67/104* | (2022.01) | |

(52) U.S. Cl.
CPC ...... *G06F 11/1464* (2013.01); *G06F 11/1469* (2013.01); *G06F 11/3006* (2013.01); *H04L 67/1044* (2013.01)

(58) Field of Classification Search
CPC ............ H04L 67/1044; H04L 67/1065; H04L 67/1097

USPC ........................................................ 714/4.11
See application file for complete search history.

(56) References Cited

U.S. PATENT DOCUMENTS

| | | |
|---|---|---|
| 8,874,505 B2 | 10/2014 | Lin et al. |
| 11,204,941 B2 | 12/2021 | Mizuno et al. |
| 2006/0165227 A1 | 7/2006 | Steeb et al. |

(Continued)

FOREIGN PATENT DOCUMENTS

| | | | |
|---|---|---|---|
| JP | 2020034961 A | 3/2020 | |
| KR | 1020070084260 A | 8/2007 | |

(Continued)

*Primary Examiner* — Yair Leibovich
(74) *Attorney, Agent, or Firm* — William Park & Associates Ltd.

(57) ABSTRACT

Disclosed herein a method for configuration of semi-managed DHT based on NDN and system therefor. The method includes: managing and sharing manager nodes based on global information; generating a sub-range segment by partitioning a keyspace area, according to each group of the data peer nodes; managing the sub-range segment by distributing the sub-range segment corresponding to each group to data peer nodes of the each group; checking and analyzing liveness of the data peer node in the each group; estimating availability of the data peer nodes by predicting lifetime of data peer nodes through the checking and analyzing of liveliness; performing risk factor prediction that estimates data availability and sub-range management overhead; and performing a sub-range management decision at each of the manager nodes based on a result of the risk factor prediction, and performing a global stabilization decision required for global system stabilization.

20 Claims, 11 Drawing Sheets

(56) References Cited

U.S. PATENT DOCUMENTS

| | | | |
|---|---|---|---|
| 2009/0316687 A1* | 12/2009 | Kruppa | ............... H04L 67/1065 |
| | | | 709/205 |
| 2012/0265895 A1* | 10/2012 | Chen | ....................... H04L 67/06 |
| | | | 709/231 |
| 2020/0136981 A1 | 4/2020 | Byun | |
| 2020/0186463 A1 | 6/2020 | Kang et al. | |

FOREIGN PATENT DOCUMENTS

| | | |
|---|---|---|
| KR | 101467961 B1 | 12/2014 |
| KR | 1020150088713 A | 8/2015 |

* cited by examiner

FIG. 6

- mdhtPrefix = /ndn/mdh/shxdgp001
  - ASSUME THAT ONLY sh-dgrp 001 GROUP EXISTS

- VidShareInterestName
  - name = [mdhtPrefix]/vid/[view_num]/[manager_name]/[data_nameSeparator]/[data_name]
  - SHARE LATEST VERSION OF INFORMATION FOR EACH NODE FOR INFORMATION VIEW OF RANGE ALLOCATION MANAGED BY MANAGER NODE

- ViewInfoInterestName
  - name = [mdhtPrefix]/info/[view_num]/[manager_name]
  - REQUEST AND PROVIDE LATEST UPDATE INFORMATION FOR INFORMATION VIEW OF RANGE ALLOCATION MANAGED BY MANAGER NODE
    - DataName
    - data_name = [mdhtgrp_num]
    - DataNameMaker
    - data_nameMaker = name_Component+domainSeparator+OxxA
    - TargetNameMaker
    - data_nameMaker = name_Component+domainSeparator+OxxB

- JoinPeerInterestName
  - name = [mdhtPrefix]/joinpeer/[view_num]/[manager_name]/[data_nameSeparator]/[data_name]/[target_data_nameSeparator]/[target_nid]
  - REQUEST PERMISSION OF MANAGER NODE TO JOIN GROUP BY SENDING JoinPeer Interest OF [mdhtPrefix] GROUP

- LeavePeerInterestName
  - name = [mdhtPrefix]/leavepeer/[view_num]/[manager_name]/[data_nameSeparator]/[data_name]/[target_data_nameSeparator]/[target_nid]
  - REQUEST PERMISSION OF MANAGER NODE TO LEAVE GROUP BY SENDING LeavePeer Interest OF [mdhtPrefix] GROUP

- CoordRangeInterestName
  - name = [mdhtPrefix]/coordrange/[view_num]/[manager_name]/[data_nameSeparator]/[data_name]/[target_data_nameSeparator]/[target_nid]
  - REQUEST TARGET NODES TO PROCESS CoordRange Interest TOGETHER WITH UPDATE INFORMATION OF INFORMATION VIEW FOR RANGE ALLOCATION TO BE READJUSTED

- CloneDataInterestName
  - name = [mdhtPrefix]/clonedata/[view_num]/[manager_name]/[data_nameSeparator]/[data_name]/[target_data_nameSeparator]/[target_nid]/[target_range]
  - REQUEST REPLICATION INFORMATION OF ALLOCATION RANGE BASED ON UPDATE INFORMATION OF INFORMATION VIEW FOR READJUSTED RANGE ALLOCATION

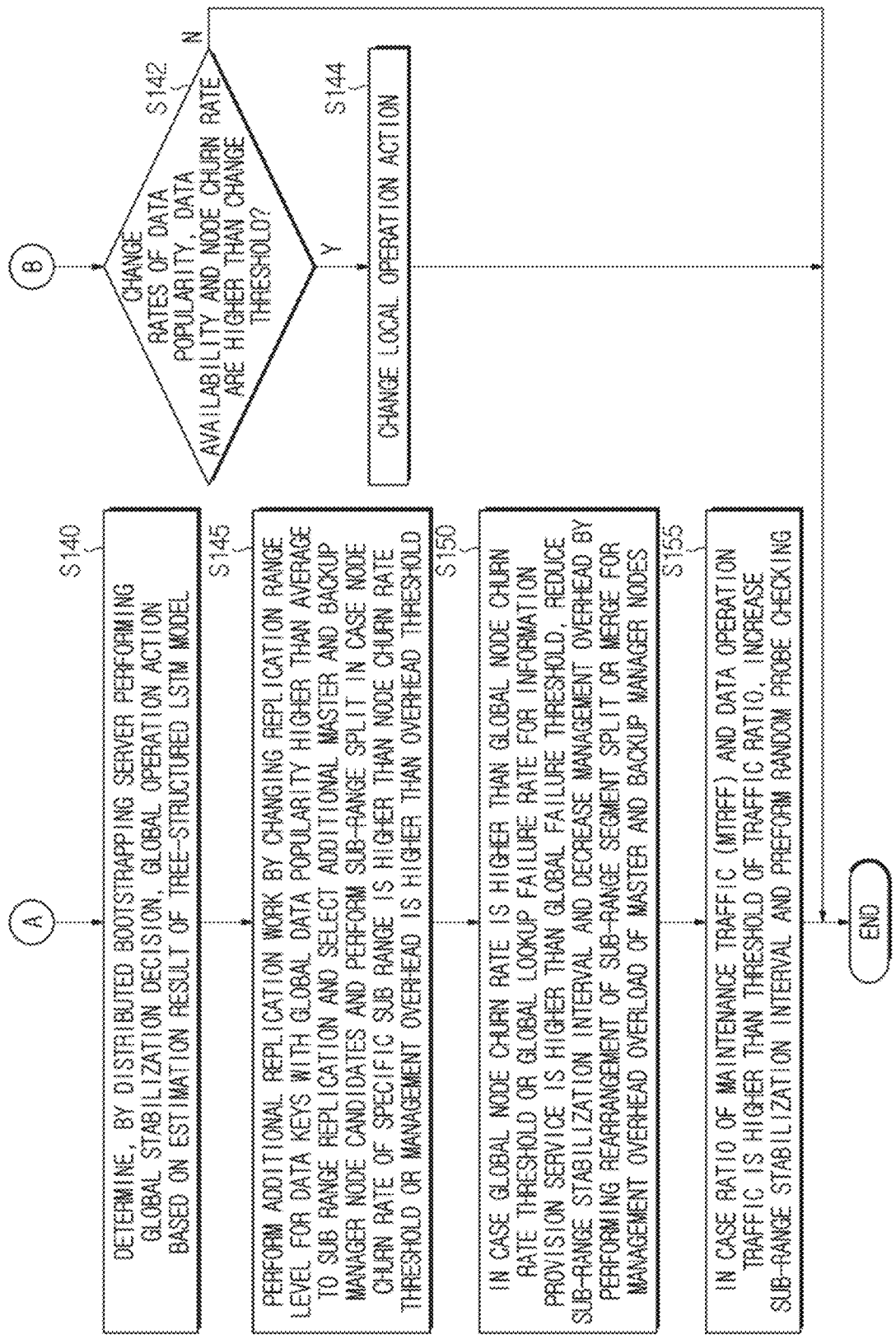

METHOD FOR CONFIGURATION OF SEMI-MANAGED DHT BASED ON NDN AND SYSTEM THEREFOR

CROSS REFERENCE TO RELATED APPLICATION

The present application claims priority to a Korean patent application 10-2020-0163863, filed Nov. 30, 2020, the entire contents of which are incorporated herein for all purposes by this reference.

BACKGROUND OF THE INVENTION

Field of the Invention

The present disclosure relates to a method and system for configuring a semi-managed DHT and, more particularly, to a method and system for configuring a semi-managed DHT based on NDN, which not only ensure a proper balance in a trade-off relation between traffic overhead of information management and data availability but also provide a hybrid-type distributed information management structure considering scalability.

Description of the Related Art

The recent advancement of hardware technology increases the propagation of various devices especially for multimedia services such as smartphones and tablets. Such a shift of device paradigm causes another paradigm shift of Internet use so that the existing web pages are drastically replaced by mobile or multimedia contents in the field of Internet use. Against this background, the information-centric network (ICN) emerges as a next Internet communication technology for shifting the existing communication paradigm to an information-based communication scheme with the aim of efficient use of massive information on the Internet. Among many research projects that are actively underway, Named Data Network (NDN) defines everything present on the Internet under the concept of information and puts the purpose of communication on information itself instead of hosts, unlike the existing Internet communication technology focusing on communication procedures based on host addresses. Accordingly, names are defined to identify information itself in NDN, unlike the current Internet and are used to retrieve information on every network as well as for the existing routing and forwarding. Thus, in relation to NDN, research on an information management structure needs to be performed by considering an amount of information and the scalability of a network size so that distributed information may be quickly accessed and shared. Furthermore, since NDN is a technology focusing on information itself as the purpose of communication in enormous social infrastructure where countless IoT devices will be connected to share and use massive information, the above-described information management structure is all the more needed.

SUMMARY

A technical object of the present disclosure is to provide a method and system for configuring an NDN-based semi-managed DHT that not only ensures a proper balance in a trade-off relation between traffic overhead of information management and data availability but also provides a hybrid-type distributed information management structure considering scalability.

The technical objects of the present disclosure are not limited to the above-mentioned technical objects, and other technical objects that are not mentioned will be clearly understood by those skilled in the art through the following descriptions.

According to the embodiment of the present disclosure, there is provided a method for configuring a semi-managed DHT. The method comprising: managing and sharing, by a distributed bootstrapping server, manager nodes based on global information, manager nodes managing a plurality of data peer nodes storing content-related information according to each group; generating a sub-range segment by partitioning a keyspace area, which indicates an information management index related to the data peer nodes, according to each group of the data peer nodes; managing, by a data peer node, the sub-range segment by distributing the sub-range segment corresponding to each group to data peer nodes of the each group; checking and analyzing, by manager nodes taking charge of the sub-range segment assigned to the each group, liveness of the data peer node in the each group; estimating availability of the data peer nodes by predicting lifetime of data peer nodes, which act dynamically, through the checking and analyzing of liveness; performing risk factor prediction that estimates data availability and sub-range management overhead for the sub-range segment based on information service operation history of the data peer nodes, which is managed at the manager nodes managed according to each group, and the lifetime; and performing a sub-range management decision at each of the manager nodes based on a result of the risk factor prediction, and performing, by the distributed bootstrapping server, a global stabilization decision required for global system stabilization.

According to the embodiment of the present disclosure in the method, the distributed bootstrapping server may have an index-range partition prefix tree, which indicates a group-based management structure of the data peer nodes and is globally shared, and configures a hierarchical sub-range index list based on the index-range partition prefix tree.

According to the embodiment of the present disclosure in the method, the hierarchical sub-range index list may have a sub-range index layer, which is configured according to each set of the manager nodes that are classified based on the index-range partition prefix tree, and a manager-set location layer that manages information of a predecessor and information of a successor based on ID information that is assigned in the each set of the manager nodes. For searching the manager nodes, the sub-range index layer may be set to enable the manager nodes to be connected in a ring circulation structure.

According to the embodiment of the present disclosure in the method, before the checking and analyzing of liveness of the data peer nodes, the method may further comprise managing, by the manger nodes, membership of the data peer nodes that are added or removed according to a dynamic action; splitting or merging a sub-range segment of a data key that is assigned to data peer nodes due to the dynamic action; and reassigning the sub-range segment of the data key to a data peer node that is added within a range of the sub-range segment.

According to the embodiment of the present disclosure in the method, the data availability may be an accuracy indicator for an information provision service of request data that are distributed and managed by the data peer nodes. And the sub-range management overhead may be a management operation overhead indicator of a manager node, which is required to check and manage data, which are distributed to the data peer nodes, and whether or not the data peer nodes operate normally.

According to the embodiment of the present disclosure in the method, the method may further comprise applying, by the manager node, the result of the risk factor prediction to a tree-structured LSTM model, before the performing of the sub-range management decision and the global stabilization decision required for global system stabilization; and determining, by the distributed bootstrapping server that performs the global stabilization decision required for global system stabilization, a global operation action for the manager nodes based on an estimation result of the tree-structured LSTM model.

According to the embodiment of the present disclosure in the method, the manager node may comprise a master manager node and a backup manager node. And the performing of the risk factor prediction may comprise estimating the data availability and the sub-range management overhead by predicting, based on history of a data key operation, which is independently processed due to a distributed information provision service from the master and backup manager nodes, and lifetime of the data peer nodes, at least one among a node churn rate, a sub-range nodes size of data peer nodes managing information within a sub-range segment, data popularity, and a lookup failure rate for a distributed information provision service of data peer nodes.

According to the embodiment of the present disclosure in the method, the method may further comprise determining a global operation action through an agreement process of distributed bootstrapping servers based on management state prediction information for a sub-range segment according to the result of the risk factor prediction, in order to reconfigure a global configuration for the manager nodes according to the result of the risk factor prediction in the distributed bootstrapping server, after the performing of the global stabilization decision required for global system stabilization based on the result of the risk factor prediction.

According to the embodiment of the present disclosure in the method, the global operation action may be, according to a predetermined condition, at least one among sub-range replication between sub-range segments, sub-range merge/split of a sub-range segment, adjustment of a sub-range stabilization interval of a sub-range segment, rearrangement of split or merge of a sub-range segment for management overhead overload of the manager nodes, and random probe check for reducing management overhead.

According to the embodiment of the present disclosure in the method, the method may further comprise changing, by the manager node, a local operation action for data peer nodes, which are managed by the manager node, according to the sub-range management decision, after the performing of the sub-range management decision according to each of the manager nodes based on the result of the risk factor prediction.

According to another embodiment of the present disclosure, there is provided a system for configuring a semi-managed DHT. The system comprising: a plurality of data peer nodes that are distributed and store content-related information; manager nodes that manage the plurality of data peer nodes according to each group and take charge of a sub-range segment assigned to the each group; and a distributed bootstrapping server that manages and shares the manager nodes based on global information. The manager nodes are configured to: generate a sub-range segment by partitioning a keyspace area, which indicates an information management index related to the data peer nodes, according to each group of the data peer nodes, set to manage, by a data peer node, the sub-range segment by distributing the sub-range segment corresponding to each group to data peer nodes of the each group, check and analyze liveness of the data peer node in the each group, estimate availability of the data peer nodes by predicting lifetime of data peer nodes, which act dynamically, through the checking and analyzing of liveliness, perform risk factor prediction that estimates data availability and sub-range management overhead for the sub-range segment based on information service operation history of the data peer nodes, which is managed at the manager nodes managed according to each group, and the lifetime, and perform, based on a result of the risk factor prediction, a sub-range management decision at each of the manager nodes. The distributed bootstrapping server performs a global stabilization decision required for global system stabilization based on the result of the risk factor prediction.

It will be appreciated by persons skilled in the art that that the effects that can be achieved through the present disclosure are not limited to what has been particularly described hereinabove and other advantages of the present disclosure will be more clearly understood from the detailed description.

According to the present disclosure, a method and system for configuring a semi-managed DHT may be provided which devise a hybrid-type distributed information management structure by considering scalability so that a proper balance may be secured in a trade-off relation between information management traffic overhead and data availability and a fault tolerant information service may also be ensured even in an abnormal operational situation of distributed nodes, which are subjects of information management.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 6 is a view showing NDN-based protocol naming that is applied to the management of the assignment of sub-range segments and the membership and liveness of data peer nodes shown in FIG. 5.

FIGS. 10A and 10B are flowchart for a method of managing semi-managed DHT configuration and system according to another embodiment of the present disclosure.

DETAILED DESCRIPTION

Figure 1:
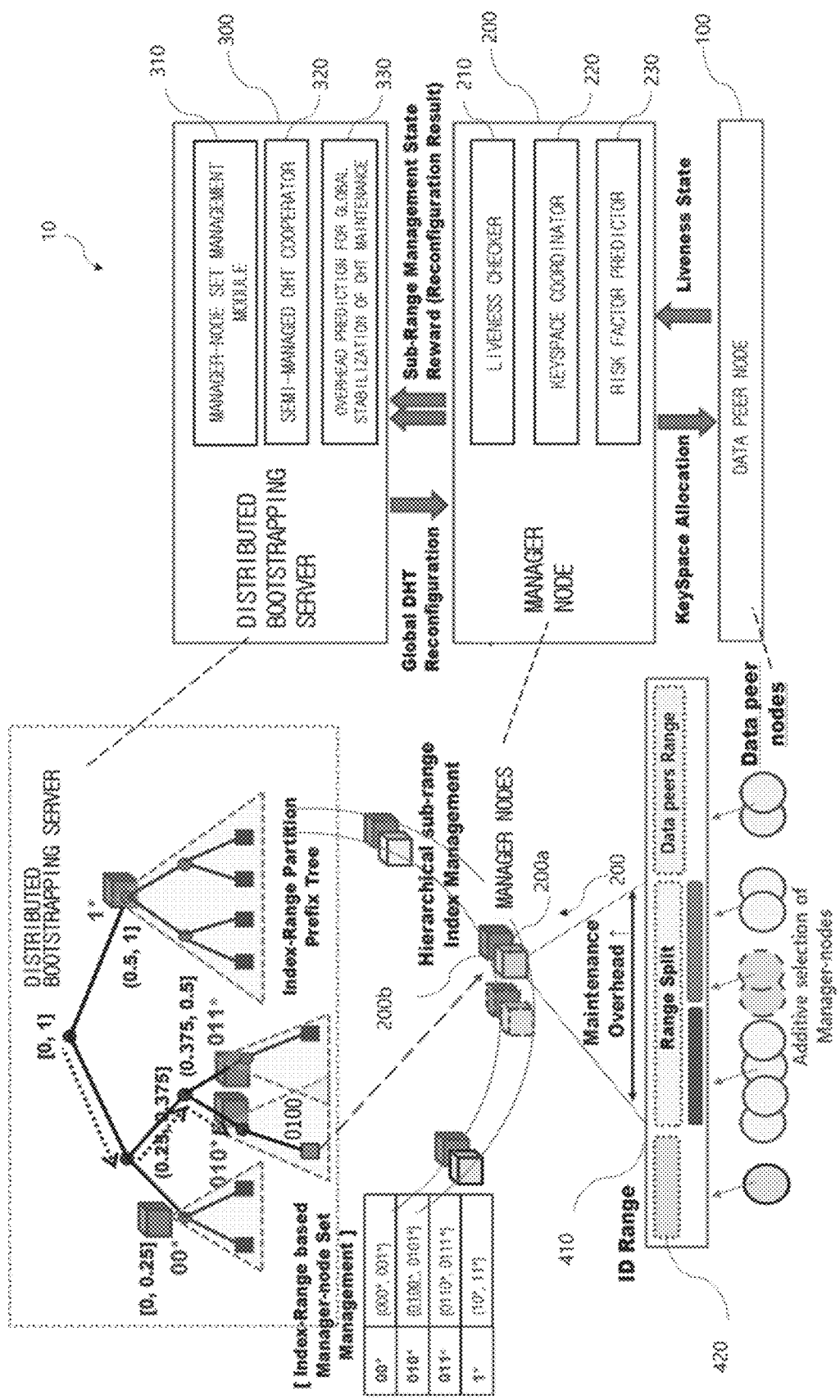
FIG. 1 is a view showing a semi-managed DHT configuration system according to an embodiment of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element"includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

Hereinafter, embodiments of the present disclosure will be described with reference to the accompanying drawings.

Referring to FIG. 1 to FIG. 6, a semi-managed DHT configuration system according to an embodiment of the present disclosure will be described.

Figure 2:
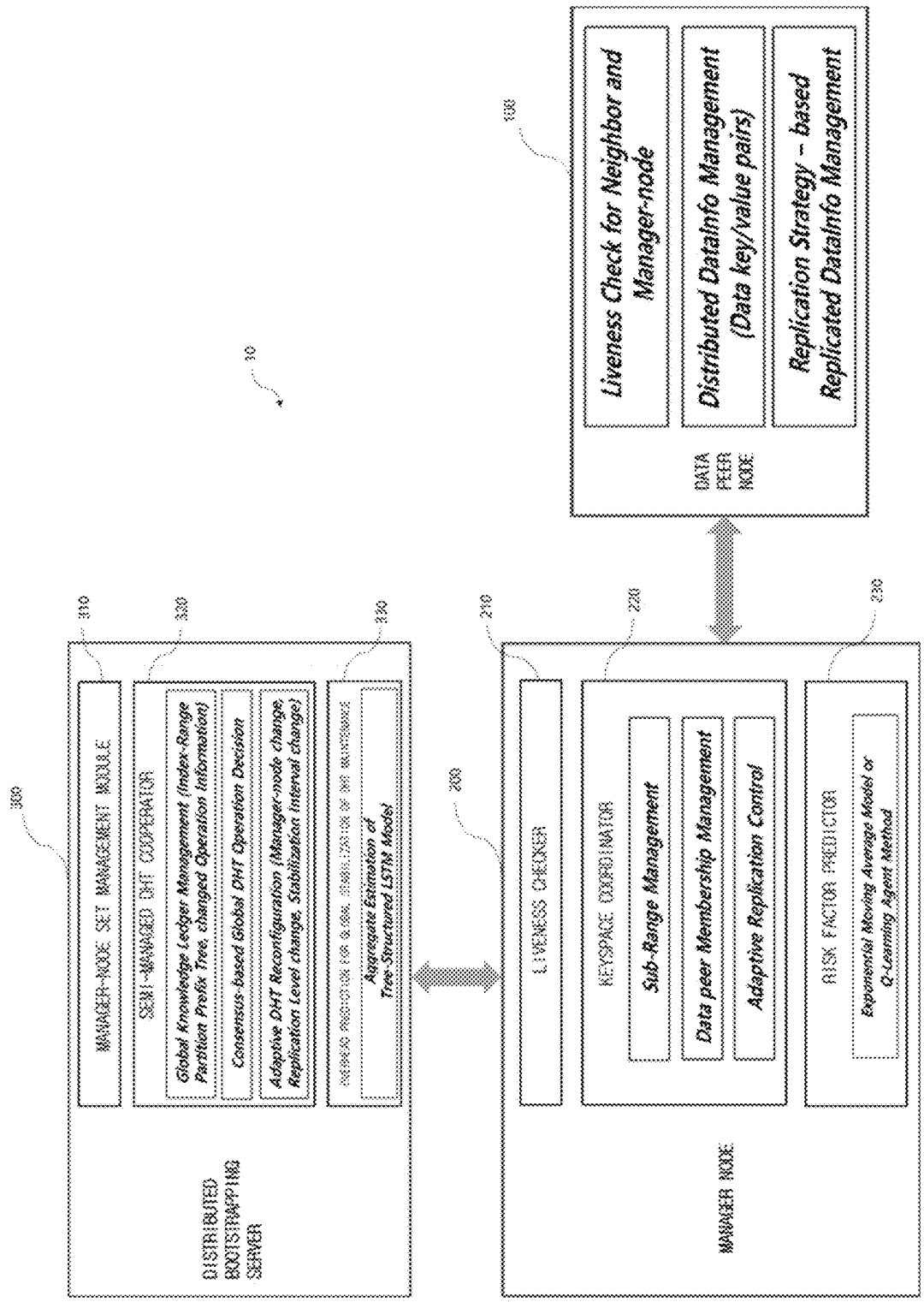
FIG. 2 is a block diagram showing unit devices of a semi-managed DHT configuration system and detailed modules of each device.

FIG. 1 is a view showing a semi-managed DHT configuration system according to an embodiment of the present disclosure. FIG. 2 is a block diagram showing unit devices of a semi-managed DHT configuration system and detailed modules of each device.

A semi-managed DHT configuration system 10, which is an NDN-based system, include a plurality of data peer nodes 100 that operates in distributed arrangement, manager nodes 200 that manage the plurality of data peer nodes by group, and a distributed bootstrapping servers 300 that share sets of manager nodes and global information (index-range partition prefix tree and a relevant set of manager nodes) and set a DHT management operation by agreement.

As for the specific modules of the manager node 200, the manager node 200 may include: liveness check for data peer nodes 100 (hereinafter, liveness checker 210); a keyspace coordinator 220; and risk factor prediction for sub-range data key management (hereinafter, a risk factor predictor 230). Also, for each manager node 200 corresponding to each group of data peer nodes 100, a master manager node 200a and a backup manager node 200b may be prepared, and the master and backup manager nodes 200a and 200b may include the above-described modules either in the same way or in different ways from each other.

The distributed bootstrapping server 300 may include: an index-range based manager-node set management module (hereinafter, manager-node set management module 310), semi-managed DHT cooperator 320, and a DHT management overhead predictor 330 (overhead prediction for global stabilization of DHT maintenance). There may be a plurality of distributed bootstrapping servers 300, and the distributed bootstrapping servers 300 may share manager-node sets and global information and also set a DHT management operation by agreement.

Hereinafter, the semi-managed DHT configuration system 10 will be described, focusing on the data peer nodes 100, the manger nodes 200, the detailed modules of the distributed bootstrapping server 300 and a relevant operation among the modules.

As the semi-managed DHT configuration system 10 according to the present disclosure manages and distributes a keyspace area (KeySpace) 410, that is, a whole information management index recording hashing values of data names related to the plurality of data peer nodes 100, which are distributed and store content-related information, the semi-managed DHT configuration system should not only consider sub-range management overhead, which is required to manage distributed data, but also ensure data availability that is required both in a dynamic environment of the data peer nodes 100 and in a problem situation of an individual node.

The semi-managed DHT configuration system 10 partitions the data keyspace area 410, which is a whole information management index, into a plurality of segments so that data in a sub-area (or sub-range segment 420) of the keyspace area 410 may be managed by being distributed into the plurality of data peer nodes 100. The sub-range segment 420 may be a data key segment area that is separated from the keyspace area 410.

In addition, each set of manager nodes 200 is configured to take charge of and to control a group of data peer nodes 100 that manage information of the sub-range segment 420, which is a sub-area of the keyspace area 410. That is, each manager node 200 takes charge of the sub-range segment 420 assigned to it according to each group of the data peer nodes 100. In this case, since a size of the data peer nodes 100, which are to be managed commonly with a required amount of data to be included in a sub-area of the corresponding keyspace area 410, is very likely to dynamically change according to an operation situation of the DHT configuration system 10, data availability needs to be ensured according to a changed size of the data peer nodes 100 or a required amount of data to be managed.

Accordingly, the semi-managed DHT configuration system 10 according to the present disclosure may provide a function of the distributed bootstrapping server 300 that manages and shares a set of manager nodes 200 based on index-range partition prefix tree, in order to perform sub-range data key management for each group of distributed data peer nodes 100 under the control of each manager node 200 in the sub-range segment 420 that is partitioned from the keyspace area 410, that is, a whole data management index. In addition, the semi-managed DHT cooperator 320 in the distributed bootstrapping server 300 may check management overhead, which occurs in each set of manager nodes 200 according to each sub-area (or sub-range segment 420) of the keyspace 410 and, when a problematic situation is predicted, additionally support a new manager node 200 that will share the overhead.

The keyspace coordinator 220 of the manager node 200 may manage an operation state for a group of data peer nodes 100, which manage data in a sub-area (or the sub-range segment 420) of the keyspace 410 and predict data availability in the sub-range and an environment situation of the semi-managed DHT configuration system 10. Thus, the above-described problematic situation may be handled.

Figure 3:
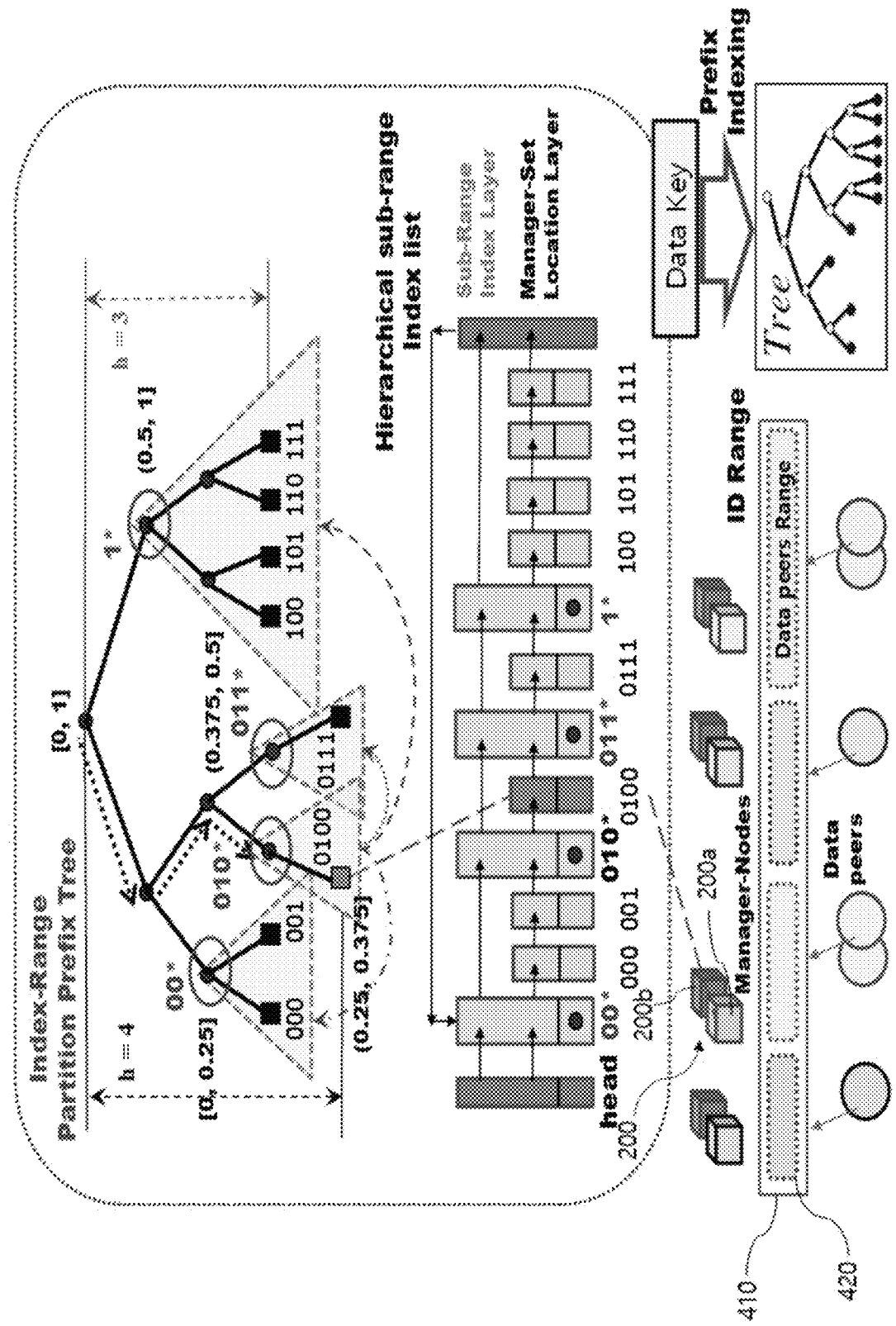
FIG. 3 shows management of master and backup manager nodes in a hierarchical sub-range index list using index-range partition prefix tree.

Referring to FIG. 2 and FIG. 3, the semi-managed DHT cooperator 320 in the distributed bootstrapping server 300 may execute a function of global knowledge ledger management in order to share global information (index-range partition prefix tree and a relevant set of manager nodes) and to set a DHT management operation by agreement.

FIG. 3 shows management of master and backup manager nodes in a hierarchical sub-range index list using index-range partition prefix tree.

A hierarchical sub-range index list may configure a sub-range index layer for each set of manager nodes 200, which are classified based on a globally-shared index-range partition prefix tree, and configure a manager-set location layer by managing predecessor (preceding node) information and successor (succeeding node) information based on identify (ID) information that is assigned within a corresponding set of manager nodes 200. As shown in FIG. 3, the index-range partition prefix tree may set and classify hashing values of data names, which are related to a set of manager nodes 200 managing a plurality of data peer nodes 100, based on a partitioned tree structure. A sub-range index layer of the hierarchical sub-range index list may be set in search for the manager node 200 so that sets of manager nodes 200 are connected in a ring circulation structure (e.g., the circulation structure according to the directions of arrows in the sub-range index layer illustrated in FIG. 3). Thus, the manager node 200 taking charge of a sub-area of a corresponding sub-range segment may be searched by using global information (index-range partition prefix tree and a relevant set of manager nodes) that is managed and shared from the manager node set management module (Index-Range based Manager-node Set Management) 310 of the distributed bootstrapping server 300.

Figure 9A:
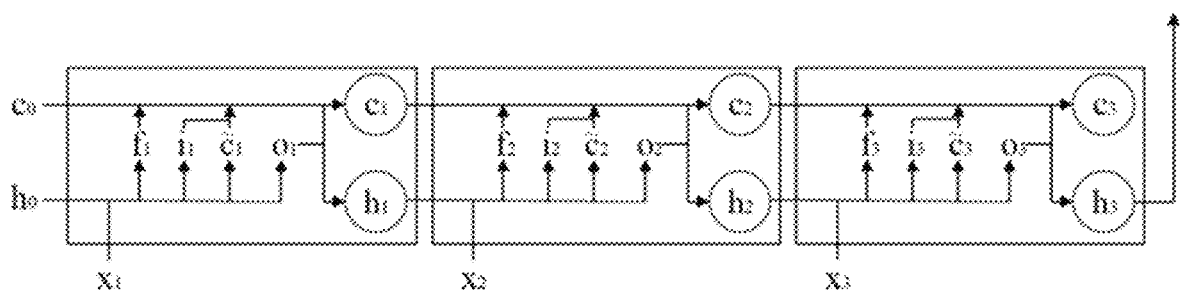
FIGS. 9A and 9B are views showing a basic LSTM model and a tree-structured LSTM model respectively.
Figure 9B:
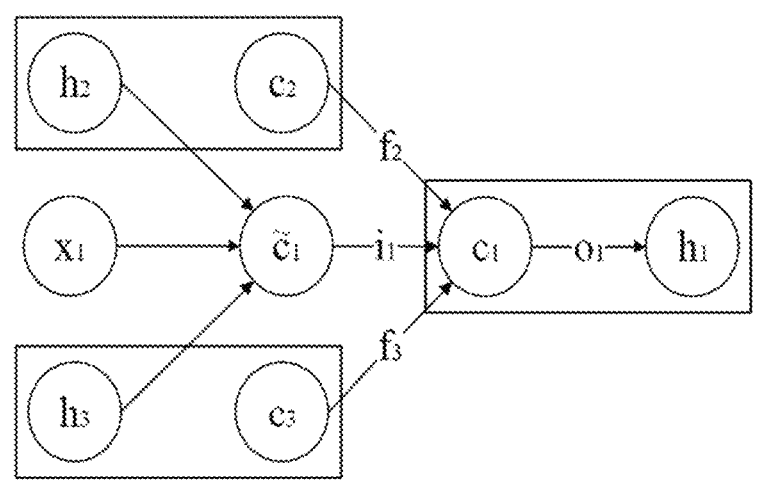

In order to handle risk factors of the semi-managed DHT configuration system 10, the distributed bootstrapping server 300 may predict an environment situation of a whole semi-managed DHT configuration system by applying a tree-structured LSTM model, which is illustrated in FIG. 9B, based on predictive information for DHT system environment situation within a sub-range, which is performed in a distributed form according to each group of manager nodes 200, to set a global configuration necessary for system stabilization.

Figure 4:
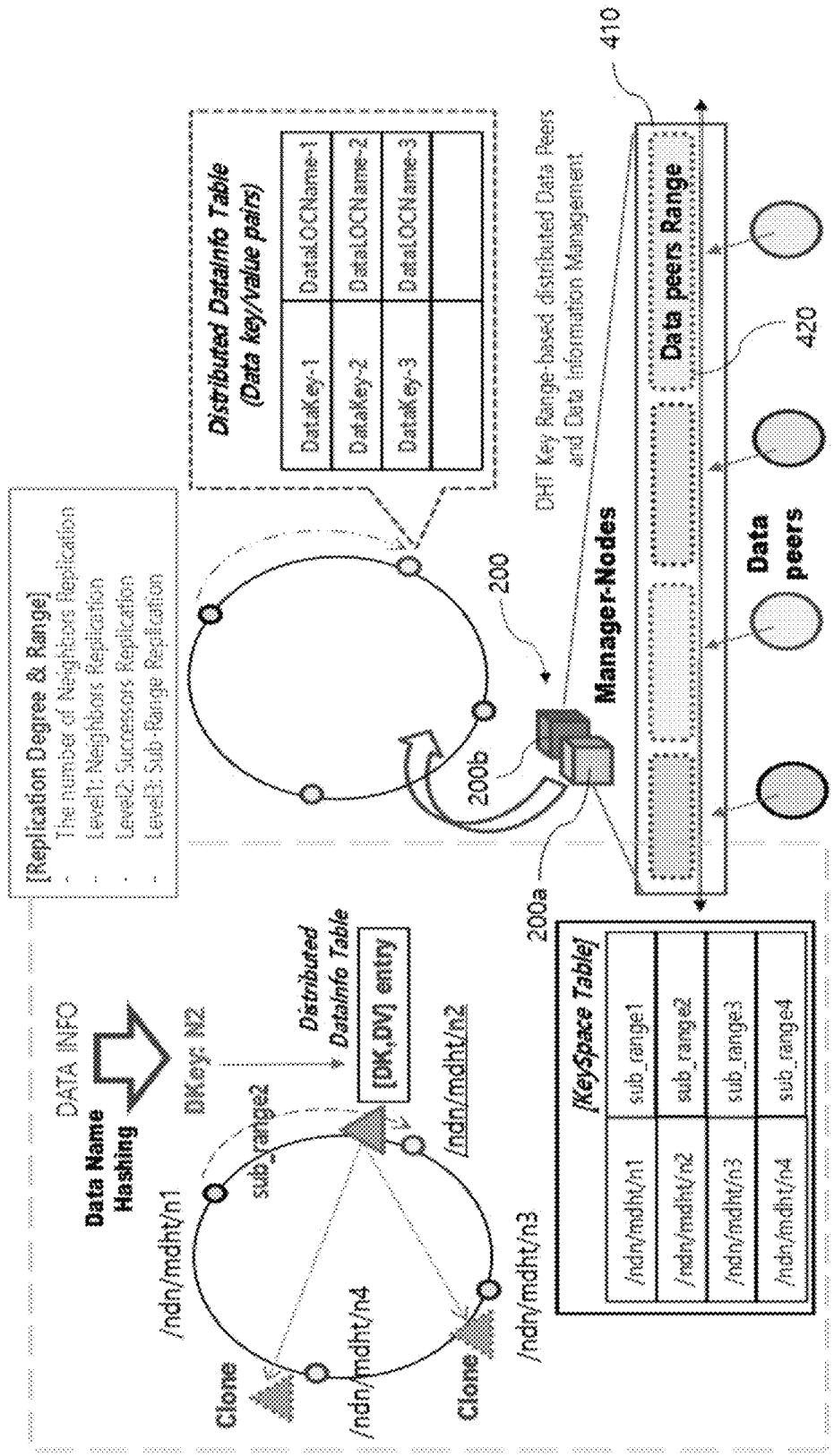
FIG. 4 shows a method for managing distributed data information table that is related to assignment of sub-range segments to data peer nodes and corresponding KeySpace Table for sub-range data key management of manager nodes.
Figure 5:
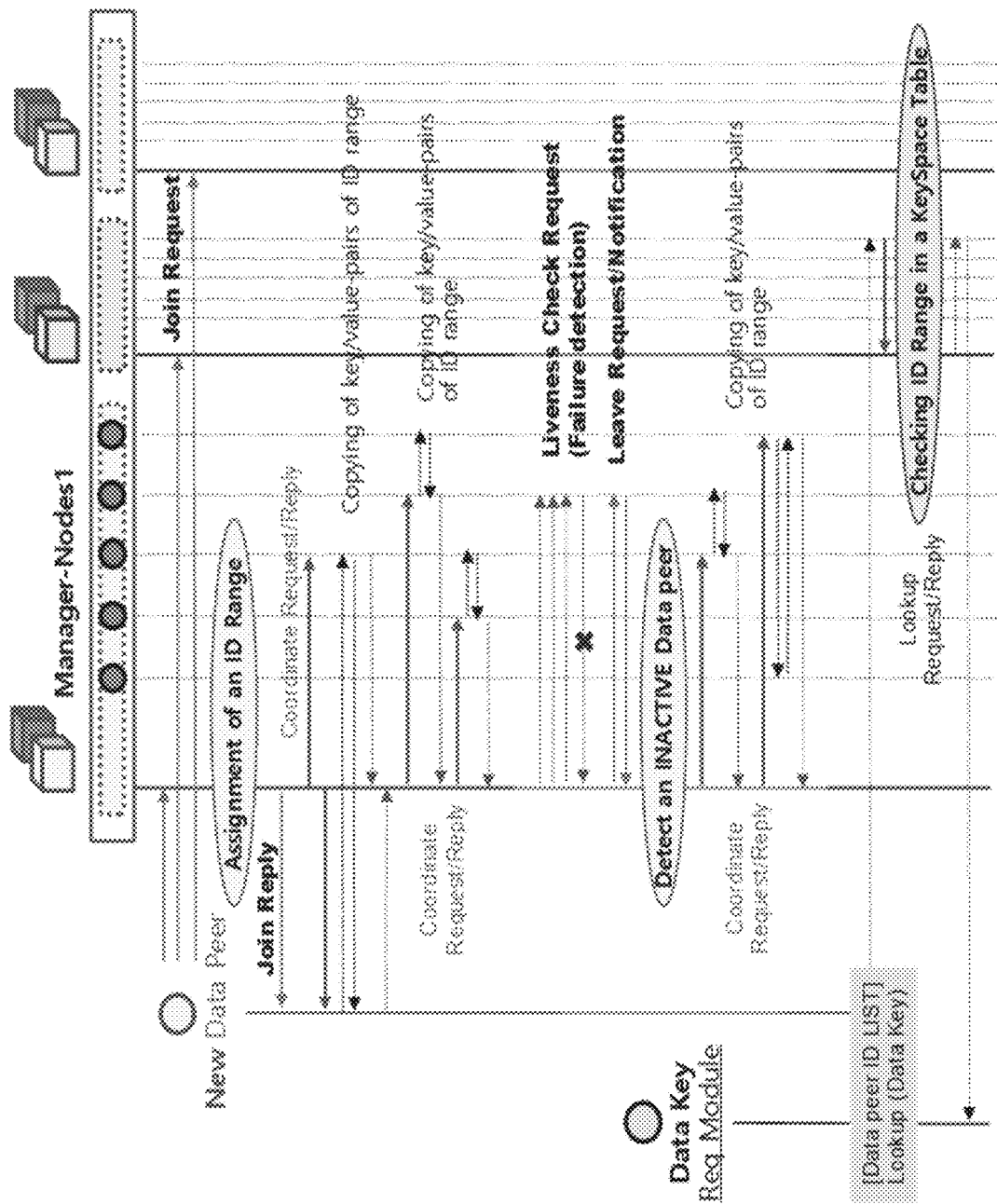
FIG. 5 is a flowchart showing a protocol of managing the assignment of sub-range segments of distributed data peer nodes for management of sub-range data keys and the membership and liveness of data peer nodes.

The manager node 200, which provides the function of data key management of a corresponding sub-range, may process the protocol flow of FIG. 5 in order to implement a method for assigning and managing segments of the keyspace area 410 of the distributed data peer nodes 200 illustrated in FIG. 4.

FIG. 4 shows a method for managing distributed data information table) that is related to assignment of sub-range segments to data peer nodes and corresponding KeySpace Table for sub-range data key management of manager nodes. FIG. 5 is a flowchart showing a protocol of managing the assignment of sub-range segments of distributed data peer nodes for management of sub-range data keys and the membership and liveness of data peer nodes.

Referring to FIG. 2 and FIG. 4, the manager node 200 may check periodically an operation state of the data peer nodes 100, which commonly manage data over a range of a keyspace segment (or the sub-range segment 420) corresponding to a data key area of a sub-range that is being currently managed, by using the liveness checker (liveness check for data peer nodes) 210. In this case, the manager node 200 manages a keyspace table of information on a key-range segment (or the sub-range segment 420) of a data key, which the keyspace coordinator 220 assigns to a group of data peer nodes 100, and provides the information. Also, the keyspace coordinator 220 may manage the membership of the data peer nodes 100, which are added or removed by a dynamic action, and perform a work of partitioning or merging a key-range segment (or the sub-range segment 420) of a data key that is assigned to the data peer nodes 100 by addition or removal of a corresponding node. Accordingly, key-range segments may be tuned within a range of a keyspace segment (or the sub-range segment 420) so as to be reassigned to the currently subscribed dynamic data peer nodes 100.

When the manager node 200 predicts a DHT system environment state in an area of a data key of a corresponding sub-range and estimates data availability based on predicted risk factors (node churn rate estimation) and data popularity estimation, a data replication strategy may be determined accordingly.

As shown in FIG. 4, the above-described data replication strategy is applied by selecting a replication range like neighbors replication, successors replication and sub-range replication and a replication degree and may be expressed in a form of sub-range local operation action.

As for the flows of protocols exemplified in FIG. 5 for managing the assignment of sub-range segments of distributed data peer nodes for management of sub-range data keys and the membership and liveness of data peer nodes, CoordRangeRequest/CoordRangeReply, JoinPeerRequest/JoinPeerReply, LeavePeerRequest/LeavePeerReply, and CloneDataRequest/CloneDataReply are protocols that are necessary to manage distributed information regarding the assignment and membership of a keyspace segment (or the sub-range segment 420) of the distributed data peer nodes 100. As the data peer node 100 is dynamically added or removed, CoordRangeRequest/CoordRangeReply may be a protocol that is related to requesting assignment of at least one suitable sub-range segment 420 to the dynamic data peer node 100, to requesting readjustment of a sub-range segment in a corresponding process of partitioning or merging the sub-range segment and to replying accordingly. JoinPeerRequest/JoinPeerReply may be a request for subscription to the manager node 200, which manages the corresponding sub-range segments 420 of the dynamic data peer node 100, and a corresponding reply.

LeavePeerRequest/LeavePeerReply may be a request of leaving at the manger node 200, which manages the sub-range segments 420 of the data peer node 100 that leaves according to policy, due to a system error or deactivation of the data peer node 100, and a corresponding reply. CloneDataRequest/CloneDataReply may be a replication request of relevant information or data of the data peer node 100 and a corresponding reply. "Copying of key/value-pairs of ID range" described in FIG. 5 may be a replicating operation for distributed information in a form of {data key, relevant information} within the keyspace area 410.

As shown in FIG. 5, by using a protocol flow that applies the NDN-based protocol names exemplified in FIG. 6 in the assignment and membership management process for a keyspace segment (or the sub-range segment 420), the manager node 200 of an NDN-based semi-managed DHT configuration system may manage key-range segment information (or the sub-range segment 420) of a data key, which is assigned to a group of multiple data peer nodes 100, in a form of keyspace table.

In the NDN-based semi-managed DHT configuration system 10 of the present disclosure, the distributed bootstrapping servers 300, which share a plurality of data peer nodes 100 operating in a distributed arrangement, a set of manager nodes 200 managing the group and global information (index-range partition prefix tree and a relevant set of manager nodes) and set a DHT management operation by agreement, may predict a current DHT system environment situation in a distributed form and identify corresponding risk factors the semi-managed DHT configuration system.

As the semi-managed DHT configuration system 10 manages a whole information management index by distributing the index to a plurality of data peer nodes 100, the semi-managed DHT configuration system 10 needs to consider both data availability of required data and sub-range management overhead required for a distributed type of data management.

Data availability, which is an accuracy indicator of an information provision service for requested data that are managed in a distributed form by the data peer nodes 100, may change according to a particular data request traffic ratio, a normal operation ratio of the data peer nodes 100, which are capable of providing the corresponding data, and a replication rate of the data. Accordingly, in order to estimate data availability, risk factors such as node churn rate estimation and data popularity estimation should be predicted and considered. As an indicator necessary to check and manage distributed data and a normal operation of the data peer nodes 100 that take charge of the distributed data, the sub-range management overhead may be estimated based on risk factors for node churn rate estimation and data popularity estimation. In addition, the sub-range management overhead should be estimated based on risk factors for sizes of nodes managing data in a group of manager nodes 200, that is, a size of a group of data peer nodes managing information within the sub-range segment 420 (sub-range nodes size estimation) Prediction of a risk factor for estimating data availability and sub-range management overhead may be predicted by the risk factor predictor 230 (risk factor prediction for sub-range data key management) of each manager node 200.

Figure 7:
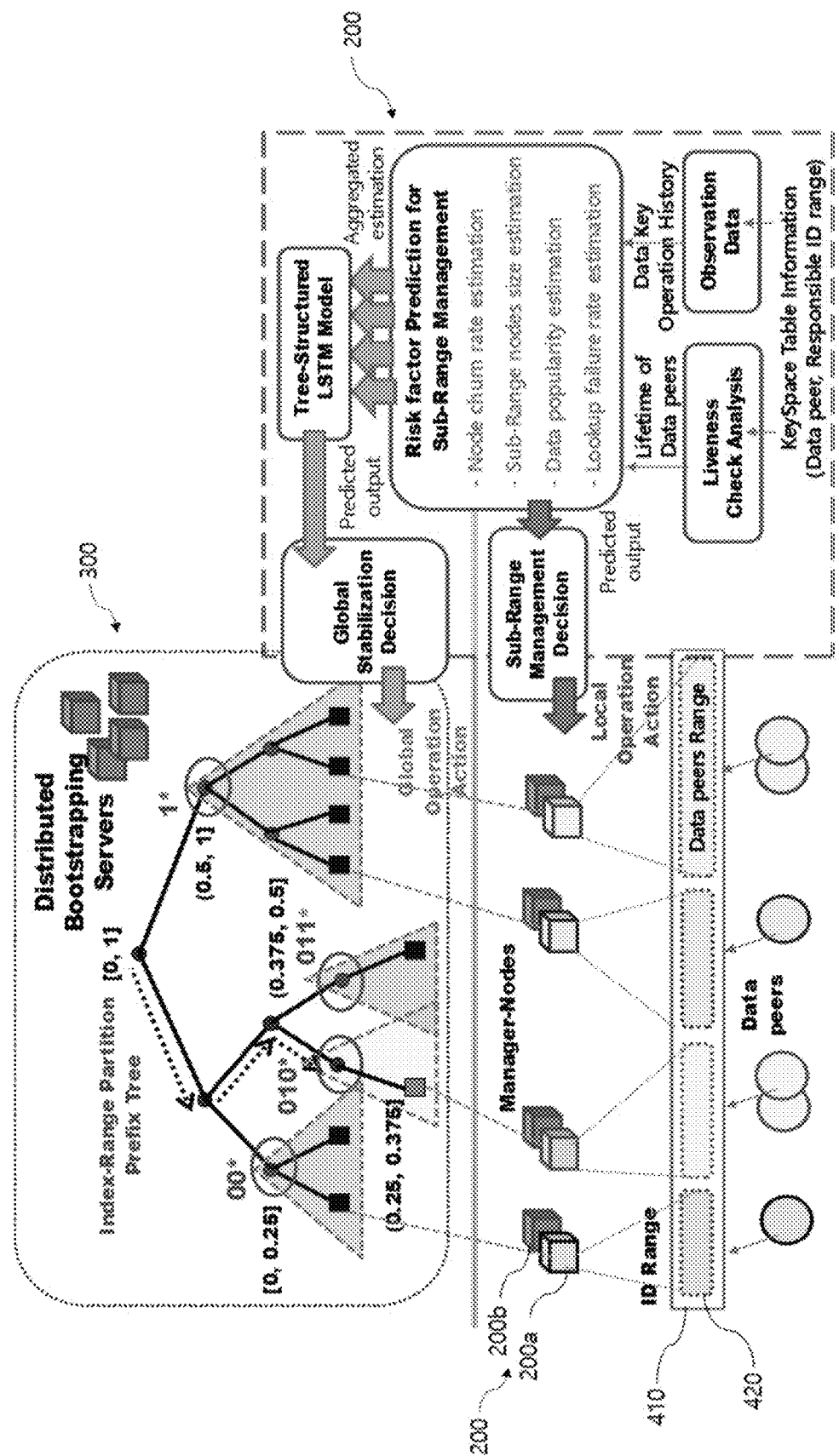
FIG. 7 is a view showing a processing method for global stabilization decision, which is required for global system stabilization, and sub-range management decision, both of which are intended to manage a semi-managed DHT configuration system.

Thus, FIG. 7 of the present disclosure illustrates a method of determining a final global operation action and a local operation action, which are required for the management and stabilization of a semi-managed DHT configuration system in the process of global stabilization decision and sub-range management decision that is required for global system stabilization according to identified prediction risk factors.

FIG. 7 is a view showing a processing method for global stabilization decision, which is required for global system stabilization, and sub-range management decision, both of which are intended to manage a semi-managed DHT configuration system.

System operation decision required for global stabilization decision may be performed by the distributed bootstrapping servers 300 and by an agreement among the servers. The above-described global stabilization decision is performed mainly by the DHT management overhead predictor 330 (overhead prediction for global stabilization of DHT maintenance) and may also be implemented by the support of the manager-node set management module 310 (index-range based manager-node set management) and the semi-managed DHT cooperator 320. The sub-range management operation decision (Sub-Range Management Decision) may be performed at each manager node 200. The sub-range management operation decision is performed mainly by the risk factor predictor 230 (risk factor prediction for sub-range data key management) and may also be implemented by the support of the liveness checker 210 (liveness check for data peer nodes) and the keyspace coordinator 220.

Data availability depends on a normal operation ratio of the data peer nodes 100 capable of providing data that are managed in a distributed form. Accordingly, node availability may be estimated by modeling lifetime of the data peer nodes 100 or a risk situation may be determined by utilizing a prediction model that estimates a data peer churn rate or node churn rate.

In this case, the prediction model for estimating a data peer churn rate may predict a recent DHT system environment situation for the data peer churn rate of the data peer nodes 100 within the manager node 200 by applying a simple weighted moving average (SWMA) or an exponential moving average (EMA).

As shown in Equation 1, a predicted SWMA value at current time t may be estimated by applying a weight w to recent k churn observation values x.

$$swma_t = w_1 x_{t-k} + w_2 x_{t-k+1} + \ldots + w_k x_{t-1},$$ [Equation 1]

$$\sum_{i=1}^{k} w_i = 1$$

Also, in order to consider information on an event later than churn observation events that are observed a predetermined time ago, a predicted EMA value at current time t may be applied as shown in Equation 2. Here, $$\alpha = \frac{2}{k+1}$$

is used as a smoothing factor.

$$ema_t = ema_{t-1} + \alpha(x_t - ema_{t-1}), t>1 \quad \text{[Equation 2]}$$

Meanwhile, Q-learning function may be utilized to calculate node availability by modeling lifetime of the data peer node 100 as shown in Equation 3. Here, $T_0$ is a time when a node first joins and operates, and n represents the number of sessions of dynamic nodes.

$$A_N = \frac{\sum_{i=1}^{n} DurationOfSession_i}{CurrentTime - T_0} \quad \text{[Equation 3]}$$

In Equation 4, an incremental predicted update value of the above-described node availability $A_N$ over time is applied to a Q-Learning method. Here, $\alpha$ denotes a learning rate.

$$Q_N \leftarrow Q_N + \alpha(A_N - Q_N) \quad \text{[Equation 4]}$$

Thus, the data availability $A_d$ at the node N may be estimated by the modeling of Equation 5 where the number of replications r for corresponding data.

$$A_d = 1 - \prod_{i=1}^{r}(1 - Q_i) \quad \text{[Equation 5]}$$

Accordingly, when applying data availability to Q-Learning, a latest predicted value may be estimated by updating Q-value according to a learning rate after performing an action that is determined in every current possible state Q(state, action).

Data availability and information on a predicted value of sub-range management overhead, which are estimated during a sub-range data key management process that is implemented in a distributed form according to each group of manager nodes 200, may be used as distributed state information that enables to identify an environmental state of a whole semi-managed DHT configuration system.

Figure 8:
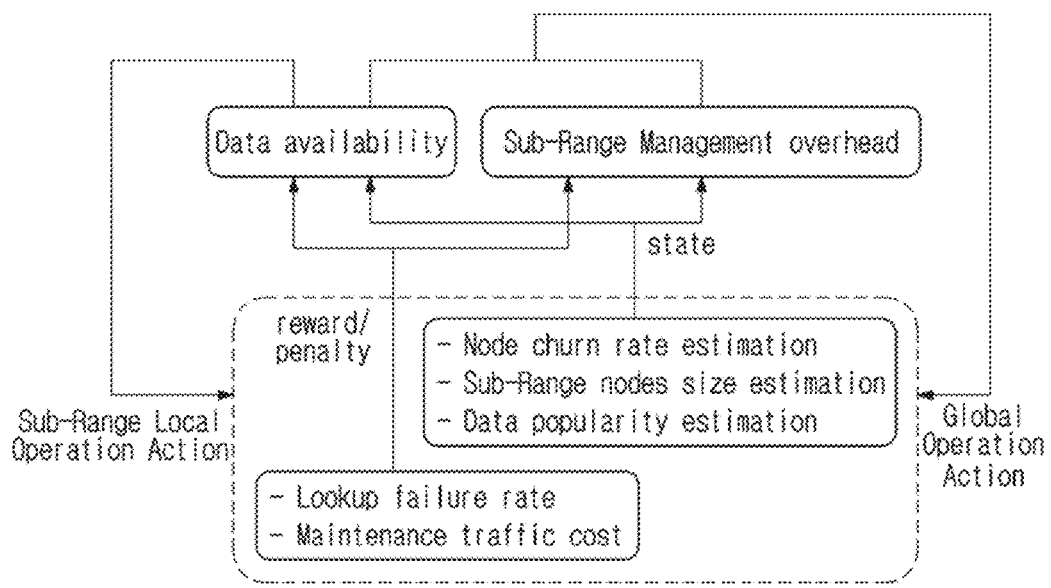
FIG. 8 is a view showing a state diagram that derives a global operation action and a sub-range local operation action by estimating data availability and sub-range management overhead.

Accordingly, the semi-managed DHT configuration system 10 according to the present disclosure, which manages and distributes a whole information management index to a plurality of data peer nodes 100, may apply a tree-structured LSTM model that uses information on data availability and sub-range management overhead, which are predicted in a distributed form within each group of manager nodes 200, as input, when predicting a dynamic environmental state of a whole DHT system. In this case, as illustrated in FIG. 8, when rewards or penalties, that is, calculated values of a lookup failure rate for a distributed information provision service of data peer nodes and a maintenance traffic cost are applied as result values of data availability and sub-range management overhead due to a current operation action, a good operation action may be set instead of a poor operation action that aggravates an environmental state of a DHT system. FIG. 8 is a view showing a state diagram that derives global operation action and a sub-range local operation action by estimating data availability and sub-range management overhead.

FIGS. 9A and 9B are views showing a basic LSTM model and a tree-structured LSTM model respectively.

Referring to and comparing the basic LSTM model of FIG. 9A and the tree-structured LSTM model of FIG. 9B, unlike the basic LSTM model, the tree-structured LSTM model has dependency of child units. The basic LSTM model has a structure with 3 nodes, and the tree-structured LSTM model has a structure with 2 child nodes. Accordingly, the child units are used also as input values, and an average value of output hidden states of all the child units having dependency may be taken as an input hidden state value.

Hereinafter, referring to FIGS. 1 to 10, a method of configuring a semi-managed DHT according to another embodiment of the present disclosure will be described.

Figure 10A:
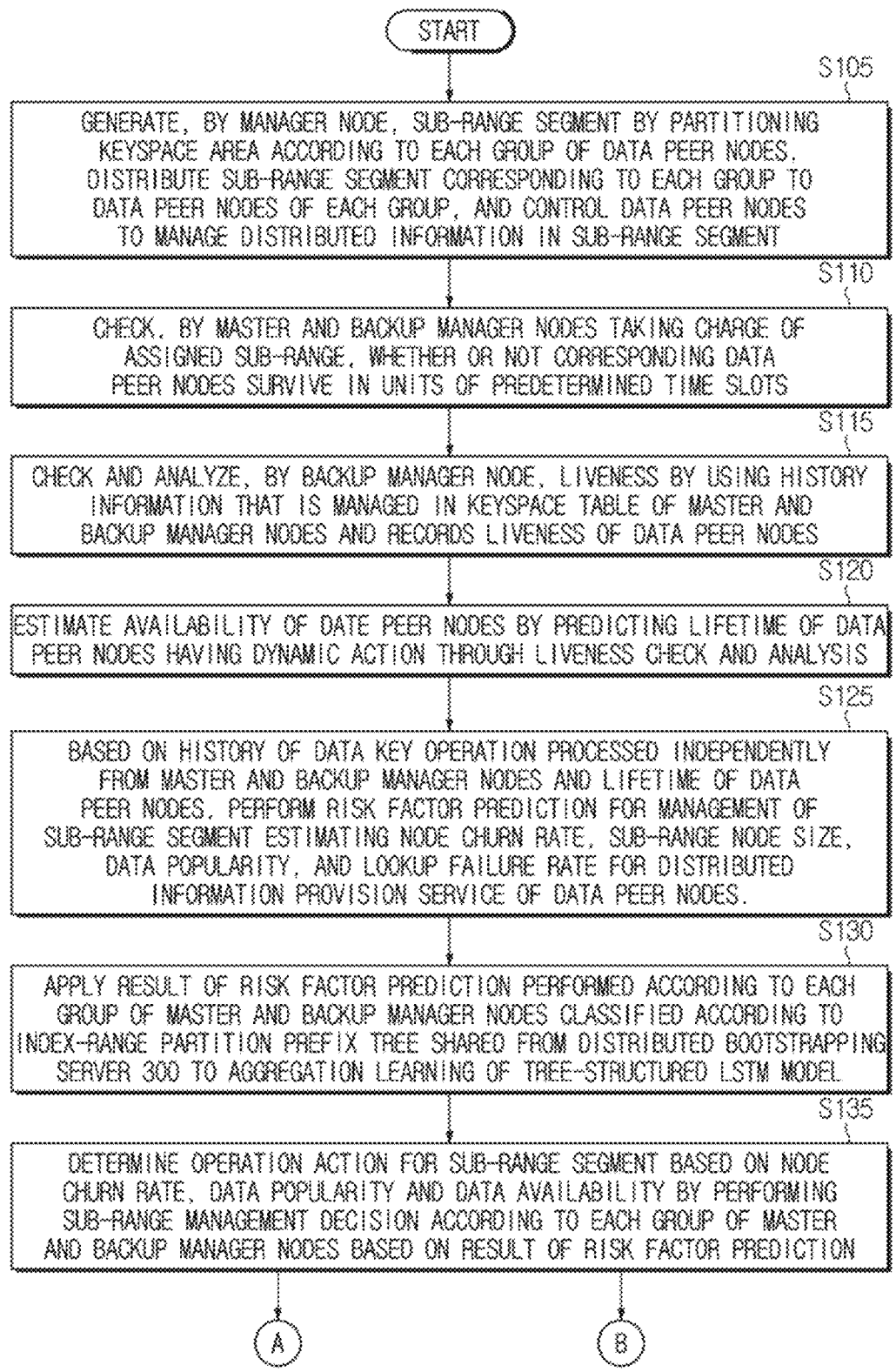

FIGS. 10A and 10B are flowchart for a method of managing semi-managed DHT configuration and system according to another embodiment of the present disclosure.

Referring to FIG. 7, FIG. 10A and FIG. 10B according to the present disclosure, in a management method for an NDN-based semi-managed DHT configuration system, the data keyspace area 410, which is a whole information management index, may be partitioned into a plurality of segments so that each set of manager nodes 200 manages and takes charge of sub-areas (or the sub-range segments 420) of the keyspace area 410. Accordingly, an environmental state of the semi-managed DHT configuration system may be predicted within a sub-range in order to see a risk factor for a distributed type of sub-range data key management according to each group of manager nodes 200.

In addition, when the sub-range environmental state of the DHT system is completely predicted in a distributed form according to each group of manager nodes 200, the distributed bootstrapping servers 300 may predict and identify risk factors of the whole semi-managed DHT configuration system 10 based on the corresponding pieces of prediction information, and a global configuration necessary for a system stabilization work may be changed. During this procedure, in order to examine and reset the global configuration necessary for the stabilization work of the whole semi-managed DHT system, the distributed bootstrapping servers 300 may determine a final global operation action by agreement among them based on state prediction information for sub-range data key management that is performed in a distributed form according to each group of manager nodes 200.

The above-described method implemented on the semi-managed DHT configuration system 10 will be described in further detail with reference to FIG. 10A and FIG. 10B. Although the modules and functions of the semi-managed DHT configuration system 10, which were described in FIGS. 1 to 9B, will be skipped without repeated description, the method below may be understood more easily in combination with the above description of the modules and functions of the system 10.

First, the manager node 200 may generate the sub-range segment 420 by partitioning the keyspace area 420 according to each group of data peer nodes 100, distribute the sub-range segment 420 corresponding to each group to the data peer nodes 100 of the group and control the data peer node 100 to manage distributed information within the sub-range segment 420 (S105).

Next, the master and backup manager nodes 200a and 200b taking charge of assigned sub-ranges may check, in a predetermined time slot unit, whether or not the data peer nodes survive (S110).

Subsequently, the backup manager node 200b may check and analyze liveness by using history information that records survival of data peer nodes and is managed in a keyspace table at the master and backup manager nodes 200a and 200b (S115).

Next, by checking and analyzing liveness, a group of manager nodes 200 may predict lifetime of data peer nodes, which are acting dynamically, and thus estimate availability of data peer nodes (S120).

Next, based on the history of a data key operation, which is processed independently of the master and backup nodes 200a and 200b, and lifetime information of the data peer nodes 100, the group of manager nodes 200 may perform risk factor prediction for the management of sub-range segment, which estimates a node churn rate, a sub-range nodes size of data peer nodes managing information within a sub-range segment, data popularity, and a lookup failure rate for a distributed information provision service of data peer nodes (S125).

This embodiment exemplifies a case in which a node churn rate, a sub-range nodes size, data popularity, and a lookup failure rate are all estimated. In another embodiment, data availability and sub-range management overhead may be estimated by predicting at least any one among a node churn rate, a sub-range nodes size, data popularity, and a lookup failure rate in some cases.

Next, a result of risk factor prediction, which is performed for each group of the master and backup manager nodes 200a and 200b that are classified according to an index-range partition prefix tree shared from the distributed bootstrapping server 300, may be applied to the aggregation learning of a tree-structured LSTM model (S130).

Next, by executing a sub-range management decision for each group of the master and backup manager nodes 200a and 200b based on the result of risk factor prediction, a group of the manager nodes 200 may determine an operation action for a sub-range segment based on a node churn rate, data popularity and data availability (S135).

Meanwhile, the process according to the route A in FIG. 10A shows a process embodiment in which the distributed bootstrapping server 300, which executes a global stabilization decision required for global system stabilization, determines a global operation action and performs a determined operation action.

In this embodiment, according to a predetermined condition, the global operation action may be at least one among sub-range replication (distributed information replication) among the sub-range segments 420, sub-range merge/split of the sub-range segment 420, adjustment of a sub-range stabilization interval of the sub-range segment 420, rearrangement of split or merge of the sub-range segment 420 for management overhead overload of the manager nodes 200, and random probe check for reducing management overhead, and all the operation actions listed are described in the route A of FIG. 10B. Accordingly, the above-described detailed operation actions may be performed when a corresponding condition is satisfied, and an order of the detailed operation actions according to the route A of FIG. 10B is described for the convenience of explanation and may vary according to whether or not a corresponding condition is satisfied.

The process according to the route B in FIG. 10B shows an embodiment in which, after executing a sub-range management decision for each group of the manager nodes 200, based on the result of risk factor prediction, the manager node 200 changes a local operation action for the data peer nodes 100 managed by the manager node 200 according to the sub-range management decision. However, the local operation action may include various detailed measures apart from the above-described example.

First, when describing the global operation action and related contents according to the route A of FIG. 10B, the distributed bootstrapping server 300, which executes the global stabilization decision) required for global system stabilization, may determine a global operation action based on an estimation result of a tree-structured LSTM model (S140).

Next, the distributed bootstrapping server 300 and the manager node 200 may perform an additional replication work by changing a replication range level for data keys, which has a global data popularity higher than an average one, to distributed information replication (sub-range replication) among sub-range segments. In case a node churn rate of a specific sub-range is higher than an churn rate threshold or management overhead is higher than an overhead threshold, the distributed bootstrapping server 300 and the manager node 200 may perform sub-range split by additionally selecting candidate master and backup manager nodes (S145).

Next, in case a global node churn rate is higher than a global node churn rate threshold or a global lookup failure rate for an information provision service is higher than a global failure threshold, the distributed bootstrapping server 300 and the manager node 200 may reduce the sub-range stabilization interval of the sub-range segment 420 and perform rearrangement of sub-range segment split or merge for management overhead overload of the master and backup manager nodes 200a and 200b, thereby reducing management overhead (S150).

Next, in case system a ratio of maintenance traffic (Mtrff) to data operation traffic (Dotriff) is higher than a traffic ratio threshold, the distributed bootstrapping server 300 and the manager node 200 may increase a management operation stabilization interval of the sub-range segment 420 and perform random probe checking for reducing management overhead (S155).

Meanwhile, when describing a local operation action and relevant content according to the route B of FIG. 10B, the manager node 200 may determine a local operation action for the data peer nodes 100 that the manager node 200 manages according to a sub-range management decision.

Next, the group of the manager nodes 200 may determine whether or not change rates of data popularity, data availability and node churn rate are higher than a change threshold (S142).

In case the determination shows that the change rates are higher than the threshold, the group of the manager nodes 200 may change a local operation in line with the case (S144).

For an example of changing a local operation, data availability may be predicted to be low, while data popularity is high, or it may be possible to increase a replication range level of data keys, which are managed by the data peer nodes 100 with a high node churn rate. When being predicted otherwise, the replication range level may be reduced.

According to the present disclosure, a method and system for configuring a semi-managed DHT may be provided which devise a hybrid-type distributed information management structure by considering scalability so that a proper balance may be secured in a trade-off relation between information management traffic overhead and data availability and a fault tolerant information service may also be ensured even in an abnormal operational situation of distributed nodes, which are subjects of information management.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for configuring a semi-managed Distributed Hash Table (DHT), the method comprising:
    managing and sharing, by a distributed bootstrapping server, manager nodes based on global information, the manager nodes managing a plurality of data peer nodes storing content-related information according to each group;
    generating a sub-range segment by partitioning a key-space area, which indicates an information management index related to the data peer nodes, according to the each group of the data peer nodes;
    managing, by the data peer node, the sub-range segment by distributing the sub-range segment corresponding to the each group to the data peer nodes of the each group;
    checking and analyzing, by the manager nodes taking charge of the sub-range segment assigned to the each group, liveness of the data peer node in the each group;
    estimating availability of the data peer nodes by predicting lifetime of the data peer nodes, which act dynamically, through the checking and analyzing of liveliness;
    performing risk factor prediction that estimates data availability and sub-range management overhead for the sub-range segment based on information service operation history of the data peer nodes, which is managed at the manager nodes managed according to the each group, and the lifetime; and
    performing a sub-range management decision at each of the manager nodes based on a result of the risk factor prediction, and performing, by the distributed bootstrapping server, a global stabilization decision required for global system stabilization.

2. The method of claim 1, wherein the distributed bootstrapping server has an index-range partition prefix tree, which indicates a group-based management structure of the data peer nodes and is globally shared, and configures a hierarchical sub-range index list based on the index-range partition prefix tree.

3. The method of claim 2, wherein the hierarchical sub-range index list has a sub-range index layer, which is configured according to each set of the manager nodes that are classified based on the index-range partition prefix tree, and a manager-set location layer that manages information of a predecessor and information of a successor based on ID information that is assigned in the each set of the manager nodes, and
    wherein, for searching the manager nodes, the sub-range index layer is set to enable the manager nodes to be connected in a ring circulation structure.

4. The method of claim 1, further comprising:
    before the checking and analyzing of liveness of the data peer nodes, managing, by the manger nodes, membership of the data peer nodes that are added or removed according to a dynamic action;
    splitting or merging a sub-range segment of a data key that is assigned to the data peer nodes due to the dynamic action; and
    reassigning the sub-range segment of the data key to the data peer node that is added within a range of the sub-range segment.

5. The method of claim 1, wherein the data availability is an accuracy indicator for an information provision service of request data that are distributed and managed by the data peer nodes, and
    wherein the sub-range management overhead is a management operation overhead indicator of a manager node, which is required to check and manage data, which are distributed to the data peer nodes, and whether or not the data peer nodes operate normally.

6. The method of claim 1, further comprising:
    applying, by the manager node, the result of the risk factor prediction to a tree-structured LSTM model, before the performing of the sub-range management decision and the global stabilization decision required for global system stabilization; and
    determining, by the distributed bootstrapping server that performs the global stabilization decision required for global system stabilization, a global operation action for the manager nodes based on an estimation result of the tree-structured LSTM model.

7. The method of claim 1, wherein the manager node comprises a master manager node and a backup manager node, and
    wherein the performing of the risk factor prediction comprises estimating the data availability and the sub-range management overhead by predicting, based on history of a data key operation, which is independently processed due to a distributed information provision service from the master and backup manager nodes, and lifetime of the data peer nodes, at least one among a node churn rate, a sub-range nodes size of the data peer nodes managing information within a sub-range segment, data popularity, and a lookup failure rate for a distributed information provision service of the data peer nodes.

8. The method of claim 1, further comprising,
after the performing of the global stabilization decision required for global system stabilization based on the result of the risk factor prediction,
determining a global operation action through an agreement process of distributed bootstrapping servers based on management state prediction information for a sub-range segment according to the result of the risk factor prediction, in order to reconfigure a global configuration for the manager nodes according to the result of the risk factor prediction in the distributed bootstrapping server.

9. The method of claim 8, wherein the global operation action is, according to a predetermined condition, at least one among sub-range replication between sub-range segments, sub-range merge/split of a sub-range segment, adjustment of a sub-range stabilization interval of a sub-range segment, rearrangement of split or merge of a sub-range segment for management overhead overload of the manager nodes, and random probe check for reducing management overhead.

10. The method of claim 1, further comprising,
after the performing of the sub-range management decision according to each of the manager nodes based on the result of the risk factor prediction,
changing, by the manager node, a local operation action for the data peer nodes, which are managed by the manager node, according to the sub-range management decision.

11. A system for configuring a semi-managed Distributed Hash Table (DHT), the system comprising:
a plurality of data peer nodes that are distributed and store content-related information;
manager nodes that manage the plurality of the data peer nodes according to each group and take charge of a sub-range segment assigned to the each group; and
a distributed bootstrapping server that manages and shares the manager nodes based on global information,
wherein each of the plurality of data peer nodes comprises:
a memory configured to store the content-related information, and
a processor configured to manage the sub-range segment,
wherein the manager nodes are configured to:
generate the sub-range segment by partitioning a key-space area, which indicates an information management index related to the data peer nodes, according to the each group of the data peer nodes,
set to manage, by the data peer node, the sub-range segment by distributing the sub-range segment corresponding to the each group to the data peer nodes of the each group,
check and analyze liveness of the data peer node in the each group,
estimate availability of the data peer nodes by predicting lifetime of the data peer nodes, which act dynamically, through the checking and analyzing of liveliness,
perform risk factor prediction that estimates data availability and sub-range management overhead for the sub-range segment based on information service operation history of the data peer nodes, which is managed at the manager nodes managed according to the each group, and the lifetime, and
perform, based on a result of the risk factor prediction, a sub-range management decision at each of the manager nodes,
wherein the distributed bootstrapping server performs a global stabilization decision required for global system stabilization based on the result of the risk factor prediction.

12. The system of claim 11, wherein the distributed bootstrapping server has an index-range partition prefix tree, which indicates a group-based management structure of the data peer nodes and is globally shared, and configures a hierarchical sub-range index list based on the index-range partition prefix tree.

13. The system of claim 12, wherein the hierarchical sub-range index list has a sub-range index layer, which is configured according to each set of the manager nodes that are classified based on the index-range partition prefix tree, and a manager-set location layer that manages information of a predecessor and information of a successor based on ID information that is assigned in the each set of the manager nodes, and
wherein, for searching the manager nodes, the sub-range index layer is set to enable the manager nodes to be connected in a ring circulation structure.

14. The system of claim 11, wherein, before checking and analyzing liveness of the data peer nodes, the manager nodes are further configured to:
manage membership of the data peer nodes that are added or removed according to a dynamic action,
split or merge the sub-range segment of a data key (key-range segment) that is assigned to the data peer nodes due to the dynamic action, and
reassign the sub-range segment of the data key to the data peer node that is added within a range of the sub-range segment.

15. The system of claim 11, wherein the data availability is an accuracy indicator for an information provision service of request data that are distributed and managed by the data peer nodes, and
wherein the sub-range management overhead is a management operation overhead indicator of a manager node, which is required to check and manage data, which are distributed to the data peer nodes, and whether or not the data peer nodes operate normally.

16. The system of claim 11, wherein the manager nodes are configured to apply the result of the risk factor prediction to a tree-structured LSTM model, before performing the sub-range management decision and the global stabilization decision required for global system stabilization, and
wherein the distributed bootstrapping server, which performs the global stabilization decision required for global system stabilization, is further configured to determine a global operation action for the manager nodes based on an estimation result of the tree-structured LSTM model.

17. The system of claim 11, wherein the manager node comprises a master manager node and a backup manager node, and
wherein the performing of the risk factor prediction comprises estimating the data availability and the sub-range management overhead by predicting, based on history of a data key operation, which is independently processed due to a distributed information provision service from the master and backup of the manager nodes, and lifetime of the data peer nodes, at least one among a node churn rate, a sub-range nodes size of the data peer nodes managing information within a sub-range segment, data popularity, and a lookup failure rate for a distributed information provision service of the data peer nodes.

18. The system of claim 11, wherein, after performing the global stabilization decision required for global system stabilization based on the result of the risk factor prediction, the distributed bootstrapping server determines a global operation action through an agreement process of distributed bootstrapping servers based on management state prediction information for a sub-range segment according to the result of the risk factor prediction, in order to reset a global configuration for the manager nodes according to the result of the risk factor prediction.

19. The system of claim 18, wherein the global operation action is, according to a predetermined condition, at least one among sub-range replication between sub-range segments, sub-range merge/split of a sub-range segment, adjustment of sub-range stabilization interval of a sub-range segment, rearrangement of split or merge of a sub-range segment for management overhead overload of the manager nodes, and random probe check for reducing management overhead.

20. The system of claim 11, wherein, after performing the sub-range management decision according to each of the manager nodes, the manager nodes change a local operation action for the data peer nodes, which are managed by the manager nodes, according to the sub-range management decision, based on the result of the risk factor prediction.

* * * * *